(12) United States Patent
Amir (10) Patent No.: US 9,306,665 B1
(45) Date of Patent: Apr. 5, 2016

(54) SYSTEM AND METHOD FOR INFRARED SIGNAL-STRENGTH RTLS

(71) Applicant: CenTrak Inc., Newton, PA (US)

(72) Inventor: Israel Amir, Newton, PA (US)

(73) Assignee: CENTRAK, INC., Newtown, PA (US)

( * ) Notice: Subject to any disclaimer, the term of this patent is extended or adjusted under 35 U.S.C. 154(b) by 29 days.

(21) Appl. No.: 14/522,970

(22) Filed: Oct. 24, 2014

(51) Int. Cl.
  *H04B 10/00* (2013.01)
  *H04B 10/079* (2013.01)
  *H04J 14/00* (2006.01)
  *H04W 4/02* (2009.01)

(52) U.S. Cl.
  CPC ........... *H04B 10/07955* (2013.01); *H04W 4/02* (2013.01)

(58) Field of Classification Search
  CPC .. H04B 10/11; H04B 10/114; H04B 10/1141; H04B 10/1143; H04B 10/1149; H04B 10/116
  See application file for complete search history.

(56) References Cited

U.S. PATENT DOCUMENTS

| 8,018,584 B1 * | 9/2011 | Amir | G01S 1/70 356/139.08 |
| 8,139,945 B1 * | 3/2012 | Amir | H04B 10/1149 340/8.1 |

* cited by examiner

*Primary Examiner* — Daniel Dobson
(74) *Attorney, Agent, or Firm* — Maldjian Law Group LLC (57) ABSTRACT

System and method of generating a received signal strength indication, the method including: selecting a high power level of a transmitter to be received above a receiver threshold at a predetermined distance from the transmitter; selecting a low power level of the transmitter to be received below the receiver threshold at the predetermined distance; transmitting a marker signal at high power; and adjacent in time to the marker signal, transmitting a power-varying signal, wherein a power of the power-varying signal varies monotonically between the high power level and the low power level.

23 Claims, 8 Drawing Sheets

SYSTEM AND METHOD FOR INFRARED SIGNAL-STRENGTH RTLS

BACKGROUND

1. Field of the Invention

Embodiments in accordance with the present invention relate to methods and systems for a low-power, infrared-aided RTL System.

2. Description of Related Art

Real Time Location Systems (RTLS) have gained in popularity in the last few years. They found their way into many applications ranging from healthcare to schools, fleet location management and many other more specialized applications. RTLS offers enhanced resolution performance by use of secondary technologies such as infrared (IR), Ultrasound (US) and Low Frequency (LF). A spatial area within which secondary technologies is available may be referred to as a zone of influence. Secondary technologies add substantial burden on battery life of RTLS components.

Conventional RTL systems typically use radio frequency (RF) transmission to determine location. The RF-based methods may be augmented with infrared (IR) transmission as a localization method in order to improve accuracy to support room and sub-room level accuracies. An IR receiver typically is incorporated into a portable device (i.e., a tag) and IR transmitters are incorporated into base stations that are scattered in rooms and corridors within the enclosure. Typically, each the IR base stations transmits an identification (ID) to the portable devices, and the location of the portable devices is determined by their vicinity to a base station.

Embodiments in accordance with the present disclosure use virtual walls as described in U.S. Pat. No. 8,018,584 ("the '584 Patent"), which is hereby incorporated by reference in its entirety. The method of the '584 Patent emits IR toward one direction while noise is injected (i.e., transmitted) to another direction such that tags can receive only IR signals from the IR emitter pointed to their side of the virtual wall. This approach is very powerful but requires extra power for noise transmission The basic advantages of synchronization of IR-based systems are described in U.S. Pat. No. 8,139,945 ("the '945 Patent") and U.S. Pat. No. 8,604,909 ("the '909 Patent"), which are hereby incorporated by reference in their entirety. Timing synchronization information is transmitted using a plurality of stationary IR base stations and a plurality of portable devices (e.g., portable tags). Each IR base station is configured to receive the timing synchronization information and to transmit a corresponding IR location code in a time period, based on the received timing synchronization information. Improved synchronization allows a tag to activate certain circuitry only when it may be needed. In the '945 Patent, in order to synchronize the end devices (i.e., tags and exciters), a return link is used back from the system (e.g., an AP) to the end devices. The conventional CCX protocol is incapable of supporting the return link because the CCX protocol is one-directional.

In the '945 Patent, each portable device is configured: 1) to receive the timing synchronization information; 2) to detect the IR location codes from the IR base stations; and 3) to transmit an output signal including a portable device ID representative of the portable device and the detected IR location code. Each portable device is synchronized to detect the IR location code in the time period based on the received timing synchronization information. The '945 Patent enables coexistence of multiple IR transmitters at the same physical space, the construction of virtual walls, as well as facilitating high tag update rate with extremely low power consumption for portable tags.

If a tag is within IR communication range of more than one IR base station, it is preferable to communicate with the closest IR base station and/or the IR base station providing the strongest received signal to the tag, and at a low cost. However, known low-cost IR receivers do not provide a direct output of received IR signal strength. Therefore, a need exists to provide low-cost calculation of received IR signal strength.

SUMMARY

Some embodiments may use ultrasound signals rather than IR signals as a secondary technology communication technology, but otherwise will have substantially the same operation and timing as embodiments that use IR signals. Usage of ultrasound signals may help reduce interference with other devices that may be controlled by IR signals, e.g., a TV in a patient room with an IR remote control.

Embodiments in accordance with the present disclosure may include a system for real-time location, the system including: a first infrared (IR) transmitter; a marker module configured to provide an identification signal to be transmitted by the first IR transmitter; a switch coupled in series with the first IR transmitter, the switch configured to turn on and turn off the first IR transmitter at a pulse repetition rate, at a time adjacent to a transmission time of the marker signal; and a control to vary IR pulse power transmitted by the first IR transmitter during a pulse, wherein the IR pulse power is monotonically varied between a first power level selected to be detected by an IR receiver and a second power level selected to be undetected by the IR receiver.

In some embodiments, the control to vary IR pulse power may include a plurality of resistors having substantially different values from each other; and a multiplexer to sequentially select a resistor from among the plurality of resistors, and to couple the selected resistor in series with the first IR transmitter and the switch. In other embodiments, the control to vary IR pulse power may include a pulse-width modulator coupled to the switch.

In some embodiments, the system may further include a detection module in the receiver, the detection module configured to detect a first point in time at which a received power-varying signal transitions from not being detected to being detected, and a second point in time at which the power-varying signal transitions from being detected to not being detected; and a processor coupled to a memory, the processor configured to calculate a time difference between the first point in time and the second point in time as a first indicator of received signal strength from the first IR transmitter.

Embodiments in accordance with the present disclosure may include a method for real-time location, the method including: selecting a high power level of a transmitter to be received above a receiver threshold at a predetermined distance from the transmitter; selecting a low power level of the transmitter to be received below the receiver threshold at the predetermined distance; transmitting a marker signal at high power; and adjacent in time to the marker signal, transmitting a power-varying signal, wherein a power of the power-varying signal varies monotonically between the high power level and the low power level.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize location sensors and other sensors (e.g., temperature and humidity) that communicate with a central monitor.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "Wi-Fi" or "conventional Wi-Fi" refers generally to a bi-directional radio communication technology that operates based on one or more of the Institute of Electrical and Electronics Engineers (IEEE) 802.11 family of standards, which are incorporated herein by reference. The IEEE 802.11 standards specify the RF and protocol characteristics of a bi-directional radio communication system.

As used herein, the term "asynchronous RTLS" refers generally to a system in which the infrastructure components (such as IR or Ultrasound emitters) are not synchronized to a central clock.

As used herein, the term "module" refers generally to a logical sequence or association of steps, processes or components. For example, a software module may comprise a set of associated routines or subroutines within a computer program. Alternatively, a module may comprise a substantially self-contained hardware device or circuit device. A module may also comprise a logical set of processes irrespective of any software or hardware implementation.

As used herein, the term "transmitter" may generally comprise any device, circuit, or apparatus capable of transmitting an electrical, electromagnetic, infrared, ultrasonic, or optical signal. As used herein, the term "receiver" may generally comprise any device, circuit, or apparatus capable of receiving an electrical, electromagnetic, infrared, ultrasonic, or optical signal. As used herein, the term "transceiver" may generally comprise any device, circuit, or apparatus capable of transmitting and receiving an electrical, electromagnetic, infrared, ultrasonic, or optical signal.

The term "computer-readable medium" as used herein refers to any tangible storage and/or transmission medium that participates in storing and/or providing instructions to a processor for execution. Such a medium may take many forms, including but not limited to, non-volatile media and volatile media. Non-volatile media includes, for example, NVRAM, flash media, or magnetic or optical disks. Volatile media includes dynamic memory, such as main memory. When the computer-readable media is configured as a database, it is to be understood that the database may be any type of database, such as relational, hierarchical, object-oriented, and/or the like.

RTL systems are known that include base stations that transmit IR signals (i.e., IR base stations) with their respective base station ID (BS-ID) to portable devices that are equipped with IR receivers. Upon reception of a BS-ID, the portable device transmits both the device ID and the received BS-ID to a reception device, for example, by radio frequency (RF) or IR transmission. The RTL system may include a server that associates the BS-ID with the device ID (received from the portable device by the reception device). In this manner, the position of the portable device may be displayed as the position of the IR base station. In exemplary implementations, both base stations and portable tags are battery operated.

Figure 1:
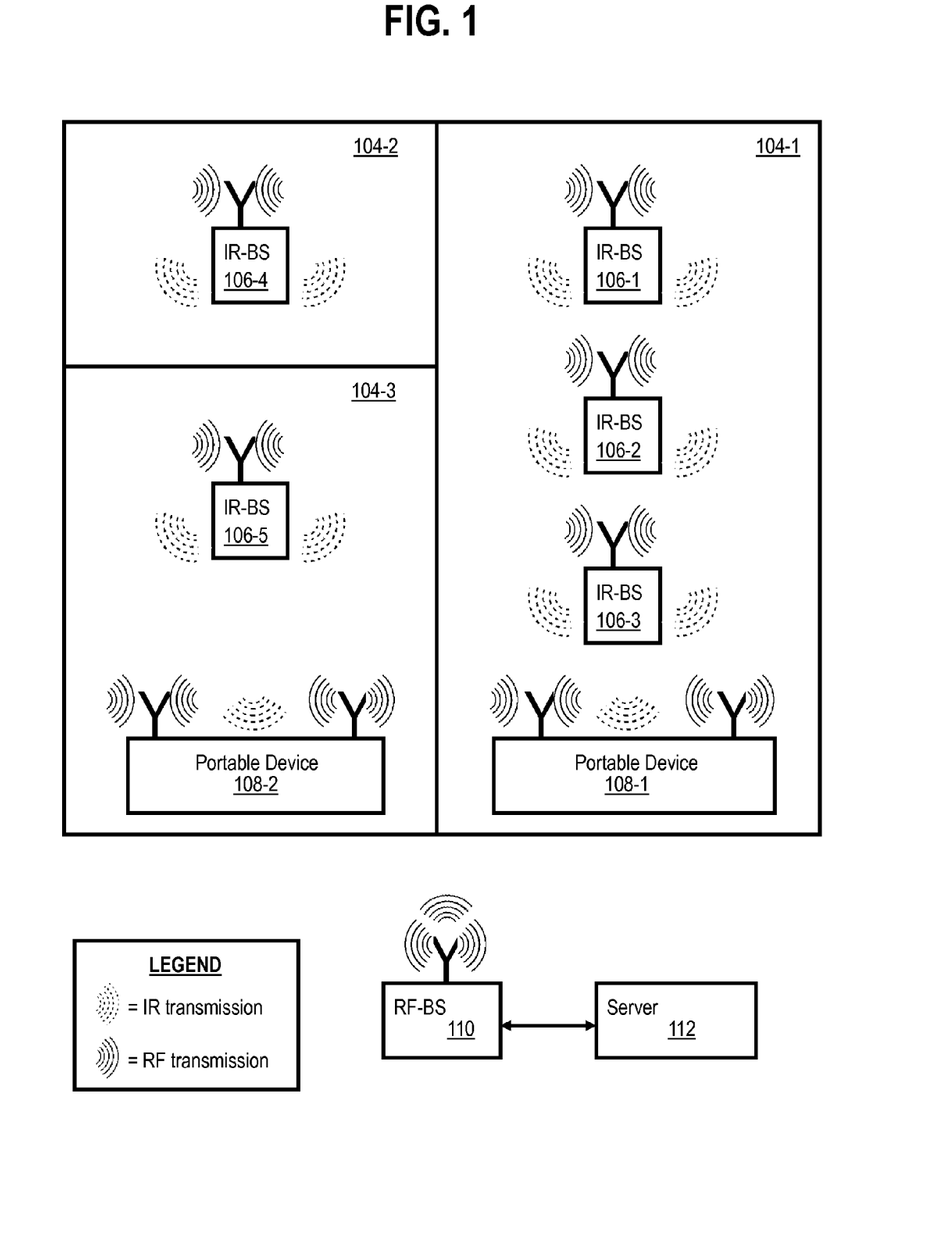
FIG. 1 is a block diagram of a system for locating and identifying portable devices in an enclosure, according to an embodiment of the present invention.

Referring now to FIG. 1, a block diagram is shown of a system 100 for determining a location and an identity of portable devices 108 in an enclosure 102. Portable devices 108 may also be referred to as tags 108. System 100 may include a plurality of IR base stations (IR-BS) 106, one or more portable devices 108 and at least one RF base station (RF-BS) 110. In some embodiments, RF base station 110 may be a Wi-Fi access point (i.e., an RF access point).

Enclosure 102 may include a plurality of separate zones 104, which typically coincide with individual rooms or zones within enclosure 102. For example, zone 104-1 represents a corridor. Each room or zone may be provided with at least one IR base station 106. For example, corridor 104-1 includes IR base stations 106-1, 106-2, 106-3.

IR base station 106 typically transmits very short bursts of IR location signals from an IR transmitter (i.e. corresponding BS-IDs) at periodic intervals based on the TSI received from RF-BS 110. Each IR base station 106 may transmit a BS-ID signal that may be identified at a central control (e.g., a server) as originating from a particular zone or room 104. The BS-ID may, for example, be transmitted with an IR modulating frequency that is typically around 40 kHz that may be in the form of bursts of the order of about 0.5 milliseconds long. It is understood that any suitable frequency and duration of the IR burst may be used.

Portable devices 108 may be provided for persons or apparatuses. The portable devices 108 may include an IR receiver and an RF transmitter or transceiver which are coupled to each other. In this manner, the RF transceiver may receive the TSI and may transmit received BS-ID and its device ID at an RF carrier frequency to RF base station 110.

The modulated carrier signal received by RF base station 110 may be decoded to reproduce the BS-ID and the device ID.

Figure 2:
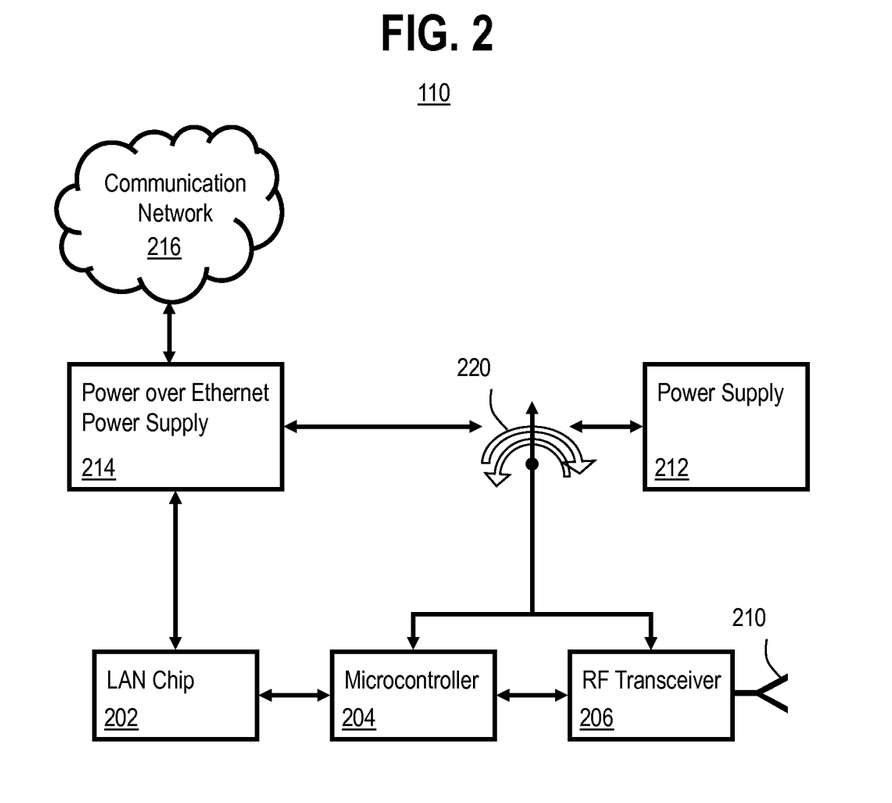
FIG. 2 is a block diagram of a radio frequency (RF) base station, according to an embodiment of the present invention.

FIG. 2 illustrates a block diagram of RF base station 110. RF base station 110 may include local area network (LAN) chip 202, microcontroller 204, RF transceiver 206, and antenna 210. Optionally, in some embodiments, the RF base-stations 110 may have their timing synchronized with each other. In one embodiment of the current invention, if the RF base-stations 110 are synchronized then the RF base-stations 110 may receive their timing synchronization via Ethernet. In another embodiment, the optional timing synchronization may be transferred from one RF base-station 110 to another.

LAN chip 202 may interface via Ethernet interface 214 to a communication network 216 such as a LAN, WAN, or Internet. Switch 220 maybe used to select a power source for RF base station, e.g., between power supply 212 or power derived from Ethernet interface 214. Power supply 212 may represent a battery or an interface to conventional AC power.

RF transceiver 206 may be configured to receive RF transmissions, for example, from portable device 108 (FIG. 1A) or from another RF base station 110, from antenna 210. RF transceiver 206 may also be configured to transmit the TSI, such as by transmitting an RF beacon that includes the TSI, via antenna 210.

Microcontroller 204 may be configured to control LAN chip 202, and RF transceiver 206, for example, to transmit the TSI, communicate with other RF base stations and receive RF transmissions from portable devices 108 (FIG. 1).

IR receiver modules of the kind used to receive a digital signal from a remote control (e.g., to enter new channel number, to adjust volume within a predetermined range and step size, mute/unmute, etc.) are ubiquitous. An example of a low-cost IR receiver of the type used to interface with conventional remote controls is the IR Receiver Module TSOP34438 by Vishay Intertechnology, Inc. Such IR receiver modules are extremely low-cost, however they provide a digital output (i.e., having binary values of ones or zeros) and do not provide information regarding the strength of the signal received (i.e., a received signal strength indicator (RSSI)). Thus such IR receiver modules ordinarily are not suitable for applications that require knowledge of the received signal strength. It would be desirable to overcome the lack of RSSI in order to design a system and method to use such modules and take advantage of their low cost. Accordingly, embodiments in accordance with the present disclosure are able to calculate an IR Received Signal Strength (RSSI) using such IR receiver modules, in order to create virtual walls using such low-cost IR receiving modules.

In contrast, location methods that depend upon the relative strengths of signals received at multiple receivers need to know the received signal strength, or a metric related to the received signal strength, in order to deduce signal strength. Therefore, embodiments in accordance with the present disclosure provide a system and method to deduce signal strength using a receiver. Although embodiments herein are described with respect to a digital-output receiver, the embodiments are adaptable to other types of receivers such as an analog receiver.

Embodiments in accordance with the present disclosure combine signal strength based location determination with secondary-technology based location determination systems in order to create a system that utilizes very low power while enabling virtual walls and control an impact of leakage of signals across virtual walls. Controlling the impact of leakage involves an ability to determine within which side of a connected area (e.g., room 104-1) a tag 108-1 is located.

For example, if IR signals from an emitter 106-5 in room 104-3 leak into a corridor 104-1, a location system may erroneously assume that tag 108-1 is in room 104-3, when in fact tag 108-1 is located in corridor 104-1, unless a method to control the impact of this leakage is used. If a second emitter 106-2 is located in corridor 104-1, and if RSSI value is used to calculate signal strength received from both a first IR emitter 106-1 and second IR emitter 106-2, then embodiments are able to determine whether a tag (e.g., tag 108-2) is in room 104-3 or whether the tag (e.g., tag 108-1) is located in corridor 104-1, based on which signal is stronger. So, deducing at least relative signal strength (or a signal related to relative signal strength), e.g., RSSI, is important.

Embodiments in accordance with the present disclosure are able to address this drawback by using a low-cost IR receiver to receive an IR signal transmitted by an appropriately-controlled IR transmitter. In particular, embodiments operate by deducing the RSSI received by a low-cost IR receiver by transmitting an IR signal from an appropriately-controlled IR transmitter, the transmitted signal being a periodic signal whose transmitted power continuously increases or decreases during at least a portion of each period of the periodic signal. On the receiver side, the time difference between the start of the signal and its end is a measure of the RSSI. In some embodiments, the IR transmitter may be one of IR emitters 106-$n$, and the IR receiver may be one of tags 108-$n$.

For example, for a signal that continuously increases during at the start of a period, the IR signal may be transmitted at the beginning of each period at a relatively low power level that is expected to be received by the IR receiver at a power level less than the IR receiver threshold, and thus is not detected by the IR receiver. As the transmitted power level increases during the period, the received power level at the IR receiver will also increase. At some point the received power level will exceed the IR receiver threshold and will be detected by the IR receiver. The IR signal will continue to be detected during the remainder of the period, until the start of the next period when the IR transmitter power is reset to a low power level. Therefore, the length of the time interval between the variable starting time of the interval of time during which the IR receiver detects the received signal in each period, and the fixed ending time of the interval of time during which the IR receiver detects the received signal, will be an indicator of an average received power level during the period.

An expectation of what transmitted power levels are expected to be received, and what transmitted power levels are not expected to be received, may be determined by geometric calculations or actual testing at the location where the transmitter and receiver will be located. For example, for a transmitter in a corner of a room, a calculation or measurement made at an opposite corner of the room may establish the maximum path loss. A measurement underneath the transmitter may establish the minimum path loss. The min/max transmitter powers may then be selected such that, at the maximum transmitted power level, a signal will be detected (i.e., be above a receiver threshold) at all locations within the room and taking into account all allowable spatial orientations of the receiver. The minimum transmitted power may be selected as a power level that does not produce a detectable received signal at any locations within the room (i.e., be below the receiver threshold) and taking into account all allowable spatial orientations of the receiver. This process may be repeated for any additional transmitters installed in the room to produce global min/max powers for the room. The global max power will be the highest maximum power over all of the max powers of individual transmitters, and the global min power will be the minimum power over all of the min power levels of individual transmitters. Other schemes for selecting the min/max powers may also be used.

Similarly, for a signal that continuously decreases during a period, the IR signal will be transmitted at the beginning of each period at a relatively high power level that will be received by the IR receiver at a power level that is greater than the IR receiver threshold, and thus is detected by the IR receiver. As the transmitted power level decreases during a period, the received power level at the IR receiver will also decrease. At some point the received power level will drop below the IR receiver threshold and will not be detected by the IR receiver. No IR signal will be detected during the remainder of the period, until the start of the next period when the IR transmitter power is reset to a high power level. Therefore, the length of the time interval between the variable ending time of the interval of time during which the IR receiver detects the received signal in each period, and the fixed starting time of the interval of time during which the IR receiver detects the received signal, will be an indicator of an average received power level during the period.

In some embodiments, the IR signal may be modulated by on/off modulated signal. Typical low-cost IR receiver modules are commercially-available to support carrier frequencies of at least approximately 30 KHz to approximately 56 KHz. Some embodiments use a carrier frequency of 38 KHz, resulting in on/off signals having a period of about 26 uS, with typically a duty cycle of 50% (i.e., about 13 uS on followed by 13 uS off).

Figure 3:
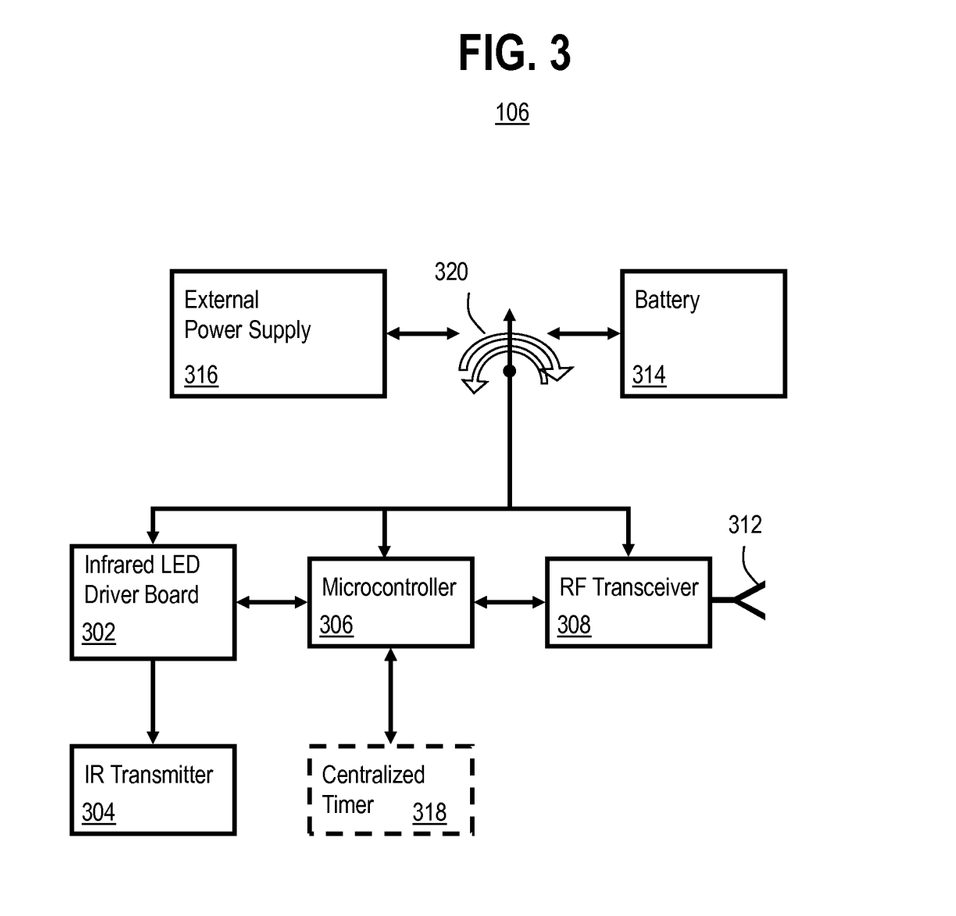
FIG. 3 is a block diagram of an infrared (IR) base station, according to an embodiment of the present invention.

FIG. 3 illustrates a block diagram of IR base station 106. IR base station includes RF receiver or transceiver 308 (henceforth collectively referred to as RF transceiver 308), antenna 312, microcontroller 306, IR LED driver board 302 and IR transmitter 304. IR base station 106 may be powered by battery 314 or by an external power supply 316. Synchronized IR base stations 106 may provide for a simple and low cost installation and allow for a coexistence of IR base stations 106 without dead regions (typically caused by an overlap in coverage). RF transceiver 308 may be configured to receive RF transmissions, for example, beacons including the TSI from RF base station 110 (illustrated in FIG. 1) via antenna 312. Switch 320 maybe used to select a power source for IR base station 106, e.g., between external power supply 316 or battery 314.

IR base station 106 may further include an interface to a centralized timer 318. Centralized timer 318 may be, e.g., a timing server accessible via a Network Time Protocol (e.g., NPTv4), as described in RFC-5905, incorporated herein by reference.

Although not shown in FIG. 3, a BS-ID associated with IR base station 106 may be stored by IR base station 106, for example, in a memory of microcontroller 306. Driver board 302 may be configured to transmit the associated BS-ID to IR transmitter 304. It is understood that IR transmitter may include any device suitable for transmitting an IR burst that includes the associated BS-ID.

The information content of the periodic bursts from IR base station 106 includes the ID of the respective IR base station 106. The power consumption of IR base station 106 is related to the size of the ID range, which typically spans 10-12 bits of information. If error detection and/or correction is added, more bits will be transmitted and the signal the power consumption increases commensurately.

Figure 4:
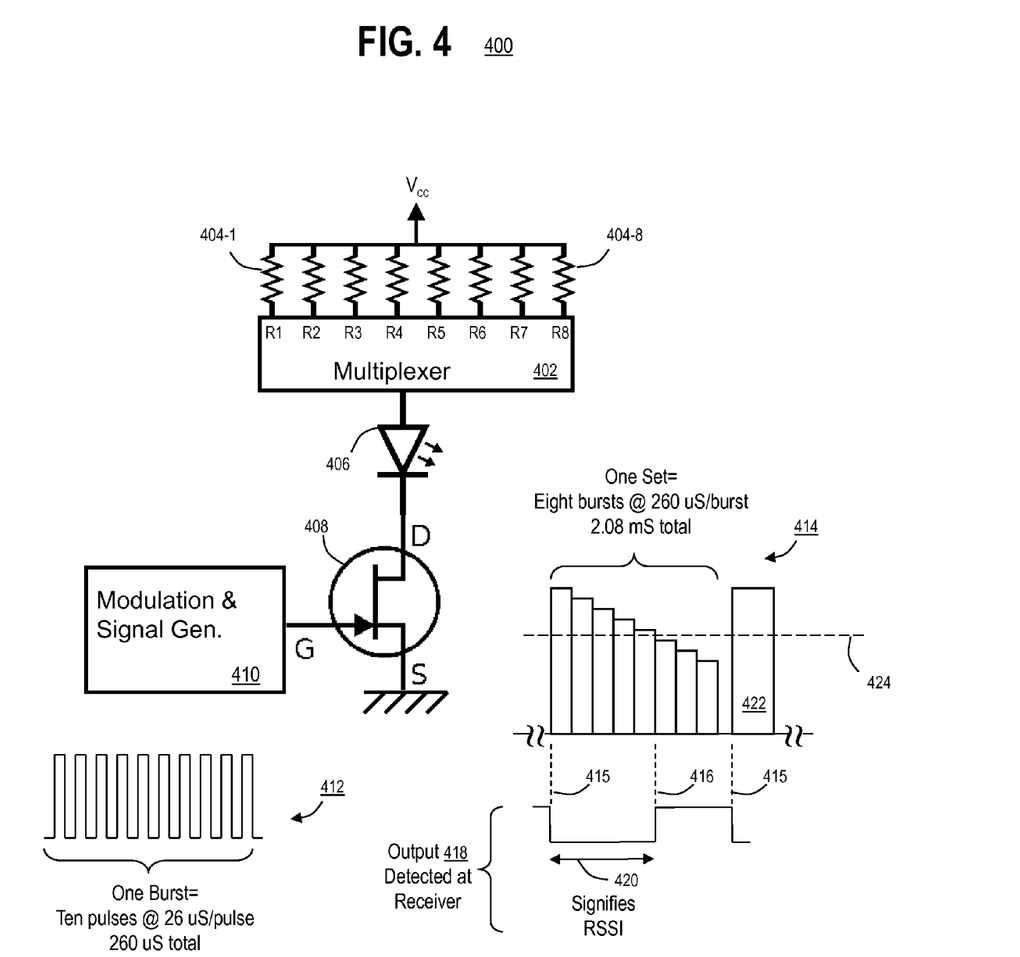
FIG. 4 depicts a system to provide a received signal strength indicator (RSSI), in accordance with an embodiment of the present invention.

FIG. 4 illustrates an embodiment 400 in accordance with the present disclosure, in which the IR transmitted power is controlled by a set of resistors 404-1 . . . 404-8 that are sequentially switched by multiplexer 402 to be in series with the IR emitter 406 and create a staircase pattern 414 in the IR transmission power, either increasing or decreasing. Resistors 404-1 . . . 404-8 are also labeled R1 . . . R8, respectively. An individual but unspecified resistor may be referred to as resistor 404 or resistor 404-$n$, and may be collectively referred to as resistors 404. For sake of clarity, not all of resistors 404 are labeled with a reference designator. FIG. 4 further illustrates a FET switch 408, whose gate line is coupled to a modulation and signal generator 410 (also referred to as generator 410). Generator 410 may provide a repetitive burst control signal 412 as illustrated, for example each burst control signal 412 having ten pulses of 26 microseconds (uS) each, for a total burst size of 260 uS. Switch 408 may be implemented with other types of switches besides a FET transistor. Other circuit configurations are usable, such that IR emitter 406 is in-series with switch 408 (e.g., the drain-source path through a FET transistor) and the combination of multiplexer 402 with resistors 404. For example, IR emitter 406 could be connected instead between the source of FET transistor 408 and ground.

The signal from generator 410 turns FET switch 408 on and off with each pulse. As illustrated in FIG. 4, the drain of FET switch 408 is coupled to the output of multiplexer 402, and the plurality of inputs to multiplexer 402 is coupled to a set of resistors 404 (one input per resistor), which is used to control the current going into the IR emitter 406. The multiplexer 402 selects one resistor 404-$n$ at a time and keeps it connected for a predefined period of time. Staircase pattern 414 illustrates an example of the IR transmitted signal during one period until the beginning of the next period. Staircase pattern 414 is illustrated as including eight IR bursts of 260 uS per IR burst, each IR burst produced by IR emitter 406 operating under control of repetitive burst control signal 412. The total time duration of staircase pattern is 2.08 milliseconds (mS). Each different signal level of staircase pattern 414 is produced when multiplexer 402 couples a different resistor 404-*n* to the drain of FET switch 408. Although the individual bursts within staircase pattern 414 are illustrated as being concatenated in time, in other embodiments a guard time may be implemented between individual bursts.

FIG. 4 illustrates a decreasing staircase pattern 414 of the transmitted IR signal. In this example, the first resistor to be connected is 404-1 (R1), which has the smallest resistance value among resistors 404 and thus yields the largest IR burst signal strength from IR emitter 406. The remainder of resistors 404-2 . . . 404-8 have progressively higher resistance values to yield progressively lower IR burst signal strengths from IR emitter 406. Although staircase pattern 414 is illustrated as decreasing approximately linearly, other patterns may be used. For example, a nonlinear pattern (and concomitant selection of resistors 404) may be used if, e.g., greater resolution is desired at certain predetermined signal levels. Staircase pattern 414 may be repeated indefinitely for each cycle during which embodiment 400 operates.

In some embodiments, each staircase pattern 414 may be preceded or followed by a transmission of ID signal 422 in order to allow an IR receiver to associate the signal strength with a base-station ID in ID signal 422.

When staircase pattern 414 is received by an IR receiver, it will have the same general shape if effects like noise and multipath reflections are ignored. However, the signal level will be attenuated by an amount given by the path loss from transmitter to receiver. Signals received with a power greater than receiver threshold 424 will be detected by the IR receiver, and signals received with a power less than receiver threshold 424 will not be detected.

The output 418 from a digital receiver is shown at the bottom right of FIG. 4. Output 418 is illustrated becoming low (active low) upon receiving at time markers 415 a burst (i.e., the first burst) for which the received IR power level exceeds the IR receiver threshold 424, and stays low until the received IR signal represented by staircase pattern 414 falls in strength below the threshold 424 of the IR receiver. Time marker 416 represents the time at which the received IR signal power no longer exceeds the receiver threshold 424. Immediately after time marker 416, the receiver no longer detects the received IR signal, and output 418 becomes high (i.e., inactive). The time difference 420 between time marker 418 and the preceding time marker 416 signifies RSSI. Time difference 420 will be shorter for relatively weak received signals, and time difference 420 will be longer for relatively stronger received signals. A curve or table may be used to relate the time difference 420 to a received power level if an actual received power level is desired. Such a curve or table may be stored within the receiver, or may be stored in a server if the receiver relays the measured time differences to the server to perform the RSSI processing. If merely a relative power level is needed (e.g., which of several received signals provided the highest power level, to within the resolution of adjacent bursts), then the time difference 420 may be used directly.

In some embodiments, a representation of output 418 may be transmitted, by a transmitter coupled to the IR receiver, to an external processing system. The external processing system may be configured to perform calculations to convert the representation of output 418 into a measurement of RSSI.

Figure 5:
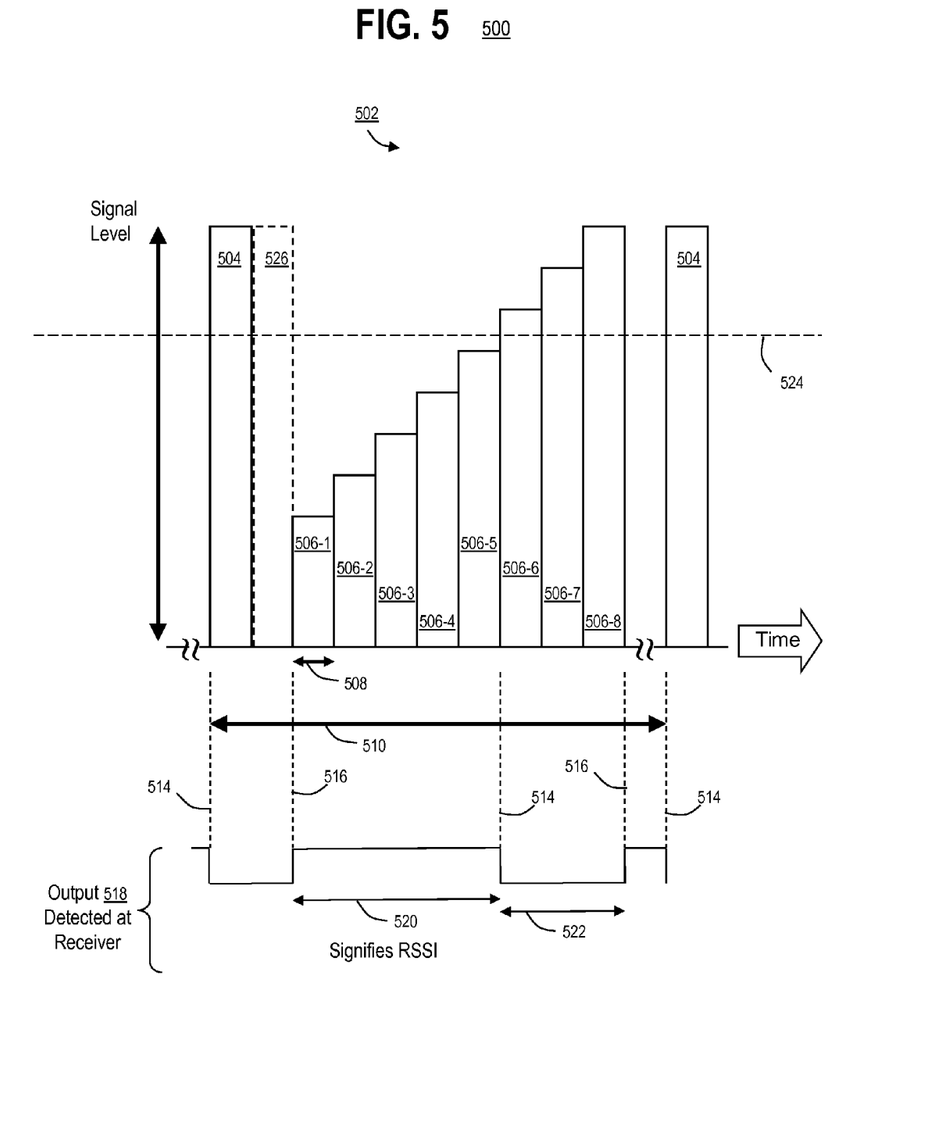
FIG. 5 depicts a signal structure for calculating RSSI, in accordance with another embodiment of the present invention.

FIG. 5 illustrates an embodiment 500 in accordance with the present disclosure, in which a set 502 of separate bursts, each set 502 typically including eight such bursts labeled as 506-1 . . . 506-8, has the bursts arranged within set 502 such that the power of consecutive bursts within set 502 increases monotonically. An individual but unspecified burst may be referred to as burst 506 or burst 506-*n*, and may be collectively referred to as bursts 506. Set 502 may be produced by a control circuit similar to the circuitry of FIG. 4, except that the sequence in which individual resistors 404-*n* are coupled to multiplexer 402 is reversed with respect to the sequence used for embodiment 400.

Duration 508 of each burst 506-*n* is typically 260 uS. Time guard bands (not illustrated in FIG. 5) may be provided between individual bursts 506. Cycle 510 is typically 5 mS in duration, and may include a marker signal 504. Marker signal 504 may be transmitted at a relatively high power level to make sure it is received. Marker signal 504 may serve a dual purpose of marking the beginning of a cycle, and of transmitting an ID signal to tags 108 that receive the signal, the ID signal being used to identify the IR emitter.

Embodiment 500 may further include transmission of an optional identification signal 526, separate from marker signal 504. If identification signal 526 is present, then marker signal does not need to include ID signal information for tags 108. Identification signal 526 may be transmitted adjacent to the power-varying signal 506-*n*. Adjacent may mean directly adjacent, or may mean with an intervening transmission of marker signal 504, and may include time guard bands to separate signals in time.

In some embodiments, a tag may be synchronized with a system such that the tag can anticipate expected times of transmissions from the system with a relatively high probability, and the tag may energize its IR receiver during brief periods of time that include the expected times of transmissions, and de-energize its IR receiver when no IR signal is expected to be received. Synchronization may follow the system and methods disclosed in the '945 Patent.

The output 518 from a digital receiver is shown at the bottom of FIG. 5. The depiction of FIG. 5 assumes that bursts 506-1 . . . 506-5 are received at a power level that is below the threshold 524 of the IR receiver. Bursts 506-6 . . . 506-8 and marker signal 504 are received at a power level that is above the threshold 524 of the IR receiver. Output 518 is illustrated becoming low (active low) upon receiving at time markers 514 an IR signal whose received power exceeds the IR receiver threshold 524, and stays low until at time markers 516 when the received IR signal power no longer exceeds the IR receiver threshold 524. Immediately after time markers 516, the output 518 transitions to a high logic level. The time difference 520 between time marker 514 and the preceding time marker 516 signifies RSSI. Alternatively, RSSI may instead be calculated from the time difference 522 between a time marker 514 and the following time marker 516. For relatively stronger received signals, time difference 520 will be shorter and time difference 522 will be longer. For relatively weaker received signals, time difference 520 will be longer and time difference 522 will be shorter.

Figure 6:
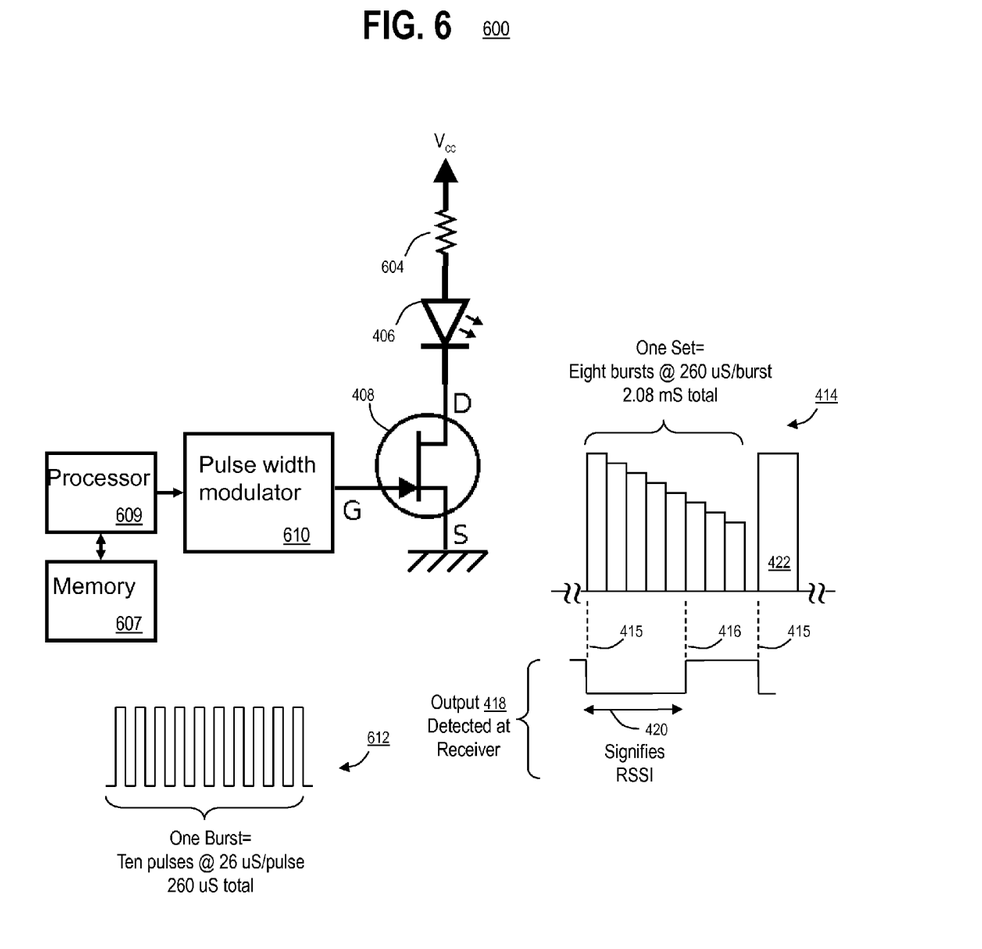
FIG. 6 depicts another embodiment of a system to provide a received signal strength indicator (RSSI), in accordance with an embodiment of the present invention.

FIG. 6 illustrates an embodiment 600 in accordance with the present disclosure, in which the stairway pattern in IR transmitted power is created by pulse-width modulation (PWM) of a control signal applied to the gate of FET transistor 408. This approach may be easier to implement because pulse-width modulator 610 may be controlled by processor 609 coupled to memory 607, in order to creating the pulse train 612. Control of pulse train 612 by processor 609 allows for more complex shapes of the pulse train 612 to be produced, e.g., pulse train 612 may follow the envelope of another signal (not illustrated in FIG. 6), or provide smoother steps, a curve instead of a stair-step pattern, more control over timing separation of burst, flexible and configurable scaling of transmit powers, and so forth. Embodiment 600 does not use a switchable bank of resistors 404, and instead may be replaced by a single equivalent resistance 604. Other circuit configurations are usable, such that IR emitter 406 is in-series with switch 408 (e.g., the drain-source path through a FET transistor) and resistance 604.

Figure 7A:
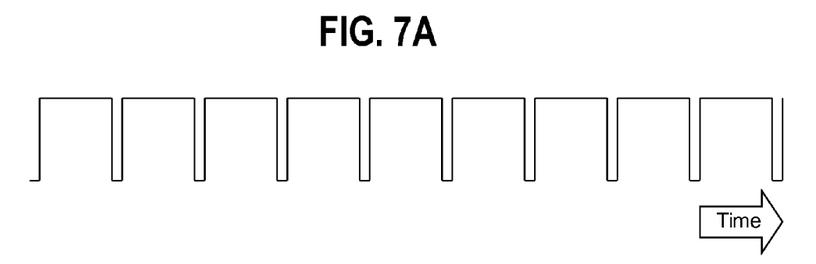
FIGS. 7A-7C depict various pulse-width modulation signals to control transmitted IR power, in accordance with another embodiment of the present invention.
Figure 7B:
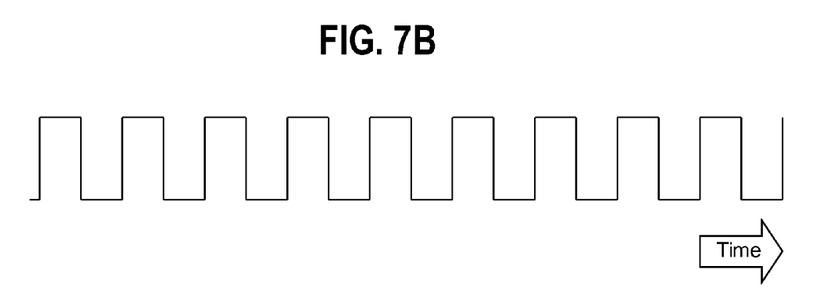
Figure 7C:
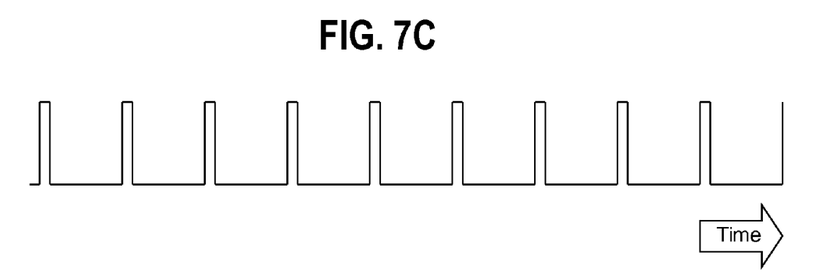

FIGS. 7A-7C illustrates examples of PWM signals that may be used with embodiment 600. For example, FIG. 7A illustrates a high duty cycle PWM signal (active low) that may be used to produce the first burst of staircase pattern 414. FIG. 7B illustrates a medium duty cycle PWM signal that may be used to produce a center burst of staircase pattern 414. FIG. 7C illustrates a low duty cycle PWM signal that may be used to produce the last burst of staircase pattern 414.

Figure 8:
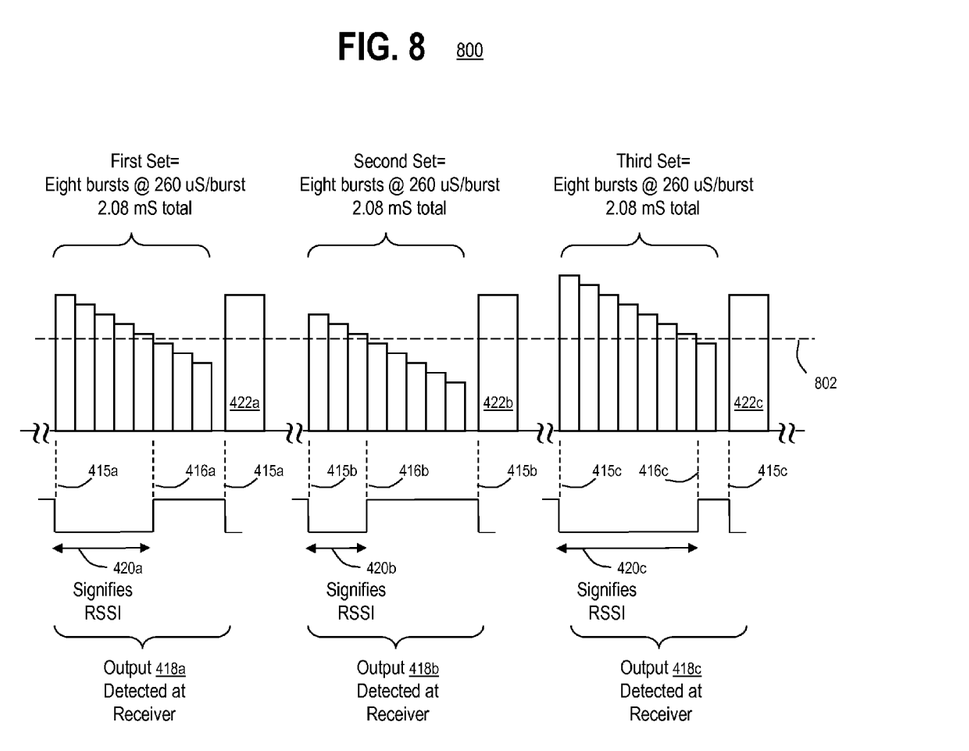
FIG. 8 depicts a synchronization scheme for multiple IR transmitters, in accordance with another embodiment of the present invention.

FIG. 8 illustrates an embodiment 800 in accordance with the present disclosure, in which transmissions from three separate IR base stations 106-*n* are coordinated to occupy separate predetermined time slots, so that there is no overlap in time at an IR receiver. The IR base stations 106-*n* are synchronized such that the transmissions are sequential in time and do not collide. Assigning predetermined time slots helps reduce interference from neighboring IR base stations 106, as received by a tag within range of multiple IR base stations 106. As illustrated in FIG. 8, the predetermined time slots for each IR base station 106 may be grouped together into a set of consecutive time slots, and entire sets of time slots may be scheduled consecutively within a period. In other embodiments (not illustrated in FIG. 8), the predetermined time slots per IR base station 106 may be interleaved to be spread out in time within a cycle.

For example, as illustrated in embodiment 800 of FIG. 8, three IR base stations 106 may be illuminating one physical location. Each of the three base-stations 106 may transmit one after the other (e.g., in 50 mS intervals), and then repeat this cycle over a longer period (e.g., once every three seconds) in order to conserve base-station power and battery life. FIG. 8 illustrates one cycle, showing a first set of bursts from transmitter "A", a second set of bursts from a second transmitter "B", and a third set of bursts from a third transmitter "C". Threshold 802 represents the IR receiver threshold. Signals arriving at the receiver having a power greater than threshold 802 will be detected by the IR receiver, and signals arriving at the IR receiver having a power less than threshold 802 will not be detected by the IR receiver. Other reference items referred to in FIG. 8 (disregarding the suffix "a", "b" or "c") have been previously described in reference to FIG. 4.

Each of the emitters may transmit an RSSI signal, illustrated as respective sets of eight signal bursts of 260 uS per burst, followed by an ID signal 422*a*, 422*b*, 422*c* respectively (e.g., an IR emitter ID) in order to associate the RSSI signal with a given base-station. In another embodiment, when power consumption by the base-stations is less critical, the emitters may continuously cycle through the time slots, causing each base-station to transmit RSSI signals much more frequently.

The tag may wait to receive transmissions from substantially all emitters, then evaluate which base-station has the highest RSSI based on one of the above methods, and transmits its value and/or a calculated position to the system by using an RF transmitter.

Using the timing scheme of FIG. 8, the tag will be able to make a quick assessment in a short period of time as to which IR base station 106 is the closest. As illustrated in FIG. 8, the signals from transmitter "C" arrive at the IR receiver with the highest received signal power, because seven of the eight bursts arrive with a received signal power greater than the IR receiver threshold. Signals from transmitter "A" arrive at the IR receiver with the next highest received signal power, because five of the eight bursts arrive with a received signal power greater than the IR receiver threshold. Signals from transmitter "B" arrive at the IR receiver with the lowest received signal power, because only three of the eight bursts arrive with a received signal power greater than the IR receiver threshold. Therefore, embodiments in accordance with the present disclosure would deduce that transmitter "C" is the closest, assuming that all three transmitters transmitted their signals with substantially the same IR transmit power. Correspondingly, interval 420*c* is longer than interval 420*a* and 420*b*, and the length of interval 420*c* may be used to deduce the received signal strength. The tag itself may perform RSSI calculations. Alternatively, the tag may transmit the multiple received IR RSSI signals from multiple received base-stations (e.g., IR emitters) to RF base-station 110 for evaluation by a more powerful computer (e.g., a system server).

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any" of followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to generate a signal for signal strength detection by a receiver, comprising:
   selecting a high power level of a transmitter, wherein the high power level is expected to be received at or above a receiver threshold of the receiver, at a predetermined distance from the transmitter;
   selecting a low power level of the transmitter, wherein the low power level is expected to be received below the receiver threshold, at the predetermined distance from the transmitter;
   transmitting, by the transmitter, a marker signal at the high power level; and
   adjacent in time to the marker signal, transmitting a power-varying signal, wherein a power of the power-varying signal varies monotonically between the high power level and the low power level.

2. The method of claim 1, wherein the marker signal further comprises an identification of the transmitter.

3. The method of claim 1, further comprising the step of: transmitting, by the transmitter, an identification signal comprising an identification of the transmitter, the identification signal transmitted adjacent to the power-varying signal, wherein the identification signal is different than the marker signal.

4. The method of claim 1, wherein the receiver comprises:
   an IR receiver; and
   a tag transmitter coupled to the IR receiver, the tag transmitter configured to transmit processed IR signal to a processing system.

5. The method of claim 1, wherein the power of the power-varying signal varies monotonically from the high power level to the low power level.

6. The method of claim 1, wherein the power of the power-varying signal varies monotonically from the low power level to the high power level.

7. The method of claim 1, wherein the marker signal and power-varying signal are periodically transmitted at predetermined time locations within a cycle, and wherein the cycle includes sufficient time to transmit a second marker signal and a second power-varying signal from a second transmitter.

8. The method of claim 1, wherein the power-varying signal comprises a plurality of bursts, wherein the transmit power within a burst is substantially constant, and wherein each burst has a transmit power that is different than a transmit power of other bursts within the power-varying signal.

9. The method of claim 1, wherein each burst comprises a plurality of pulses, wherein a pulse-repetition rate of the plurality of pulses is between about 30 KHz to about 56 KHz.

10. A method to detect signal strength by a receiver, comprising:
    receiving, from a first transmitter by the receiver, a marker signal at a high power level;
    adjacent in time to the marker signal, receiving a power-varying signal, wherein a power of the power-varying signal varies monotonically;
    detecting a first point in time at which the power-varying signal transitions from not being detected to being detected;
    detecting a second point in time at which the power-varying signal transitions from being detected to not being detected; and
    calculating a time difference between the first point in time and the second point in time as a first indicator of received signal strength from the first transmitter.

11. The method of claim 10, further comprising scaling the time difference to a first received signal strength.

12. The method of claim 10, further comprising:
    calculating an indicator of received signal strength of a second received signal from a second transmitter; and
    further communicating with the first or second transmitter that provided the stronger of the first and second received signals.

13. The method of claim 10, further comprising:
    synchronizing the receiver to transmitter timing; and
    de-energizing the infrared (IR) receiver when no IR signal is expected to be received.

14. The method of claim 10, further comprising calculating a range to the first transmitter.

15. A system to provide a received signal strength indictor for a receiver, comprising:
    a first infrared (IR) transmitter;
    a marker module configured to provide an identification signal to be transmitted by the first IR transmitter;
    a switch coupled in series with the first IR transmitter, the switch configured to turn on and turn off the first IR transmitter at a pulse repetition rate, at a time adjacent to a transmission time of the marker signal;
    a control to vary IR pulse power transmitted by the first IR transmitter during a pulse, wherein the IR pulse power is monotonically varied between a first power level selected to be detected by an IR receiver and a second power level selected to be undetected by the IR receiver; and
    a portable tag comprising:
       a tag IR receiver configured to receive signals from the first IR transmitter;
       a detection module configured to provide an indication of detection of a signal received by the tag IR receiver above a predetermined signal strength; and
       a tag transmitter configured to transmit the indication.

16. The system of claim 15, wherein the tag transmitter comprises an RF transmitter.

17. The system of claim 15, wherein the control to vary IR pulse power comprises:
    a plurality of resistors having substantially different values from each other; and
    a multiplexer to sequentially select a resistor from among the plurality of resistors, and to couple the selected resistor in series with the first IR transmitter and the switch.

18. The system of claim 15, wherein the control to vary IR pulse power comprises a pulse-width modulator coupled to the switch.

19. The system of claim 15, wherein the marker signal and power-varying signal are periodically transmitted at predetermined time locations within a cycle, and wherein the cycle includes sufficient time to transmit a second marker signal and a second power-varying signal from a second IR transmitter.

20. The system of claim 15, wherein the power-varying signal comprises a plurality of bursts, wherein the transmit power within a burst is substantially constant, and wherein each burst has a transmit power that is different than a transmit power of other bursts within the power-varying signal.

21. The system of claim 15, wherein each burst comprises a plurality of pulses, wherein a pulse-repetition rate of the plurality of pulses is between about 30 KHz to about 56 KHz.

22. The system of claim 15, further comprising:
    a detection module in the receiver, the detection module configured to detect a first point in time at which a received power-varying signal transitions from not being detected to being detected, and a second point in time at which the power-varying signal transitions from being detected to not being detected; and a processor coupled to a memory, the processor configured to calculate a time difference between the first point in time and the second point in time as a first indicator of received signal strength from the first IR transmitter.

23. The system of claim 15, further comprising:

a processor configured to calculate an indicator of received signal strength of a second received signal from a second IR transmitter; and a transmitter configured to transmit to a processing system an indication of the stronger of a first received signal and the second received signal.

* * * * *